United States Patent
Jiang et al.

(10) Patent No.: US 11,659,485 B2
(45) Date of Patent: *May 23, 2023

(54) MESSAGE TRANSMITTING/RECEIVING APPARATUS AND METHOD AND COMMUNICATION SYSTEM

(71) Applicant: FUJITSU LIMITED, Kawasaki (JP)

(72) Inventors: Qinyan Jiang, Beijing (CN); Hua Zhou, Beijing (CN); Wei Xi, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/378,972

(22) Filed: Jul. 19, 2021

(65) Prior Publication Data

US 2021/0345242 A1 Nov. 4, 2021

Related U.S. Application Data

(63) Continuation of application No. 16/175,050, filed on Oct. 30, 2018, now Pat. No. 11,076,349, which is a
(Continued)

(51) Int. Cl.
*H04W 4/00* (2018.01)
*H04W 52/02* (2009.01)
(Continued)

(52) U.S. Cl.
CPC ......... *H04W 52/0212* (2013.01); *H04W 8/26* (2013.01); *H04W 24/02* (2013.01); *H04W 52/0225* (2013.01)

(58) Field of Classification Search
None
See application file for complete search history.

(56) References Cited

U.S. PATENT DOCUMENTS 11,076,349 B2 * 7/2021 Jiang ................. H04W 52/0225
2005/0192021 A1 9/2005 Lee et al.
(Continued)

FOREIGN PATENT DOCUMENTS

CN      101742626 A    6/2010
CN      102113403 A    6/2011
(Continued)

OTHER PUBLICATIONS

Notice of Reasons for Refusal issued by the Japan Patent Office for corresponding Japanese Patent Application No. 2021-087200, dated Aug. 2, 2022, with an English translation.
(Continued)

*Primary Examiner* — Clemence S Han
(74) *Attorney, Agent, or Firm* — Myers Wolin, LLC

(57) ABSTRACT

A message transmitting/receiving apparatus and method and a communication system. The message transmitting method includes: determining a message type of a message to be transmitted to one or more user equipments; scrambling control information of the message by using an identity to which the message type corresponds; wherein, different identities correspond to different message types; and transmitting data information of the message and the scrambled control information to the one or more user equipment.

17 Claims, 10 Drawing Sheets

Related U.S. Application Data continuation of application No. PCT/CN2016/081544, filed on May 10, 2016.

(51) Int. Cl.
*H04W 8/26* (2009.01)
*H04W 24/02* (2009.01)

(56) References Cited

U.S. PATENT DOCUMENTS

| | | | |
|---|---|---|---|
| 2010/0034161 A1* | 2/2010 | Luo | H04B 1/707 375/295 |
| 2011/0038299 A1 | 2/2011 | Sugawara et al. | |
| 2012/0188951 A1 | 7/2012 | He et al. | |
| 2014/0119263 A1 | 5/2014 | Shauh et al. | |
| 2014/0140260 A1 | 5/2014 | Wang et al. | |
| 2014/0206406 A1* | 7/2014 | Cordeiro | H04W 72/046 455/501 |
| 2014/0244488 A1 | 8/2014 | Kim et al. | |
| 2014/0293838 A1 | 10/2014 | Lim et al. | |
| 2014/0328329 A1 | 11/2014 | Novlan et al. | |
| 2015/0131599 A1* | 5/2015 | Xue | H04W 72/1226 370/329 |
| 2015/0139153 A1* | 5/2015 | Zhang | H04W 76/10 370/329 |
| 2015/0271006 A1* | 9/2015 | Han | H04L 27/0012 370/329 |
| 2015/0296490 A1* | 10/2015 | Yi | H04L 1/1812 370/329 |
| 2016/0249266 A1* | 8/2016 | Kim | H04W 4/06 |
| 2017/0164363 A1* | 6/2017 | Zhang | H04W 72/0446 |
| 2017/0280481 A1* | 9/2017 | Stern-Berkowitz | H04L 1/1854 |
| 2019/0069233 A1 | 2/2019 | Jiang et al. | |

FOREIGN PATENT DOCUMENTS

| | | |
|---|---|---|
| CN | 102413576 A | 4/2012 |
| CN | 102769827 A | 11/2012 |
| CN | 103237336 A | 8/2013 |
| CN | 104468030 A | 3/2015 |
| CN | 104756566 A | 7/2015 |
| CN | 105122288 A | 12/2015 |
| CN | 105191178 A | 12/2015 |
| JP | 2007-518306 A | 7/2007 |
| JP | 2011-527474 A | 10/2011 |
| JP | 2013-118512 A | 6/2013 |
| JP | 6937320 B2 | 9/2021 |
| WO | 2007/086679 A1 | 8/2007 |
| WO | 2009/131087 A1 | 10/2009 |
| WO | 2010/003440 A1 | 1/2010 |
| WO | 2015/065053 A1 | 5/2015 |
| WO | 2015/142469 A2 | 9/2015 |

OTHER PUBLICATIONS

International Search Report issued by the State Intellectual Property Office of China for corresponding International Patent Application No. PCT/CN2016/081544, dated Jan. 26, 2017, with an English translation.

Written Opinion of the International Searching Authority issued by the State Intellectual Property Office of China for corresponding International Patent Application No. PCT/CN2016/081544, dated Jan. 26, 2017, with an English translation.

Notification of Reasons for Refusal issued by the Japan Patent Office for corresponding Japanese Patent Application No. 2018-557101 dated Oct. 23, 2019 with an English translation.

Non-Final Office Action issued by the United States Patent and Trademark Office for corresponding U.S. Appl. No. 16/175,050, dated Feb. 20, 2020.

Final Office Action issued by the United States Patent and Trademark Office for corresponding U.S. Appl. No. 16/175,050, dated Jun. 26, 2020.

Advisory Action issued by the United States Patent and Trademark Office for corresponding U.S. Appl. No. 16/175,050, dated Oct. 6, 2020.

First Notification of Office Action and Search Report issued by the China National Intellectual Property Administration for corresponding Chinese Patent Application No. 201680084459.1, dated Dec. 2, 2020, with an English translation.

Notice of Allowance issued by the United States Patent and Trademark Office for corresponding U.S. Appl. No. 16/175,050, dated Mar. 25, 2021.

Notice of Reasons for Refusal issued by the Japan Patent Office for corresponding Japanese Patent Application No. 2018-557101, dated Mar. 23, 2021, with an English translation.

Decision of Rejection issued by the China National Intellectual Property Administration for corresponding Chinese Patent Application No. 201680084459.1, dated May 7, 2022, with an English translation.

Third Notification of Office Action issued by the China National Intellectual Property Administration for corresponding Chinese Patent Application No. 201680084459.1, dated Jan. 26, 2022, with an English translation.

Second Notification of Office Action and Search Report issued by the China National Intellectual Property Administration for corresponding Chinese Patent Application No. 201680084459.1, dated Aug. 9, 2021, with an English translation.

Decision of Refusal and Decision of Dismissal of Amendment issued by the Japan Patent Office for corresponding Japanese Patent Application No. 2021-087200, dated Jan. 24, 2023, with an English translation.

Fourth Notification of Office Action and Search Report issued by the China National Intellectual Property Administration for corresponding Chinese Patent Application No. 201680084459.1, dated Feb. 10, 2023, with an English translation.

* cited by examiner

MESSAGE TRANSMITTING/RECEIVING APPARATUS AND METHOD AND COMMUNICATION SYSTEM

CROSS-REFERENCE TO RELATED APPLICATION

This application is a continuation application of U.S. application Ser. No. 16/175,050, which is a continuation application of International Application PCT/CN2016/081544 filed on May 10, 2016 and designated the U.S., the entire contents of each are incorporated herein by reference.

TECHNICAL FIELD

This disclosure relates to the field of communication technologies, and in particular to a message transmitting/receiving apparatus and method and a communication system.

BACKGROUND

With the continuous development and progress of the society, the continuous growth of the demand for communication services poses challenges for future wireless communication systems.

In order to support the rapidly growing service amounts and the increasing number of new services, research institutes and standardization organizations around the world have launched researches of the fifth generation (5G) wireless communication system.

For example, "an Internet of vehicles" has drawn attention of a large amount of research institutes and standardization organizations. Three scenarios of the Internet of vehicles have been defined in the 3rd Generation Partnership Project (3GPP): vehicle-to-vehicle (V2V) communication, vehicle-to-pedestrian (V2P) communication and vehicle-to-infrastructure/network (V2I/N) communication, which may be collectively referred to as V2X.

For another example, following scenarios, machine type communication (MTC), enhanced mobile broadband (eMBB), and ultra-reliable and low-latency communication (URLLC), etc., are concerned.

On the other hand, a user equipment (UE) is an important component of a wireless communication system, and is a carrier that directly provides various types of communication services for users. The user equipments are not only limited to human-oriented terminal types, such as mobile phones. The Internet of Things (IoT) oriented user equipments, such as sensors, machines, and robots will be applied on a large scale. Due to the limited size of user equipments, as the types of services are diversified and the needs of users continue to increase, the complexity and power consumption of user equipments will become more severe.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that future wireless communication systems need to further consider reducing the power consumption of a user equipment as much as possible while satisfying a large number of diverse service needs of users. In communications such as V2P, and MTC, etc., the transmission and reception of a large number of messages (e.g., broadcast/multicast messages) will cause the user equipment to frequently monitor and receive messages, resulting in excessive power consumption.

Embodiments of this disclosure provide a message transmitting/receiving apparatus and method and a communication system, in which power consumption of a user equipment is reduced by scrambling/descrambling control information of a message by using an identity to which a message type corresponds.

According to a first aspect of the embodiments of this disclosure, there is provided a message transmitting method, including:

determining a message type of a message to be transmitted to one or more user equipments;

scrambling control information of the message by using an identity to which the message type corresponds; wherein, different identities correspond to different message types; and transmitting data information of the message and the scrambled control information to the one or more user equipments.

According to a second aspect of the embodiments of this disclosure, there is provided a message transmitting apparatus, including:

a type determination unit configured to determine a message type of a message to be transmitted to one or more user equipments;

an information scrambling unit configured to scramble control information of the message by using an identity to which the message type corresponds; wherein, different identities correspond to different message types; and a message transmitting unit configured to transmit data information of the message and the scrambled control information to the one or more user equipments.

According to a third aspect of the embodiments of this disclosure, there is provided a message receiving method, including:

descrambling received control information by using an identity corresponding to a message type; wherein, different identities correspond to different message types; and receiving data information associated with the control information under a condition that the control information is successfully descrambled.

According to a fourth aspect of the embodiments of this disclosure, there is provided a message receiving apparatus, including:

an information descrambling unit configured to descramble received control information by using an identity corresponding to a message type; wherein, different identities correspond to different message types; and a message receiving unit configured to receive data information associated with the control information under a condition that the control information is successfully descrambled.

According to a fifth aspect of the embodiments of this disclosure, there is provided a communication system, including:

a network device, including the above-described message transmitting apparatus; and a user equipment, including the above-described message receiving apparatus.

An advantage of the embodiments of this disclosure exists in that the network device scrambles the control information of the message by using the identity to which the message type corresponds, and the user equipment descrambles the control information by using the identity to which the message type corresponds, and continues to receive the message (i.e. data information) only when the control information is successfully descrambled. Hence, the user equipment may not proceed with processing a message that is not preferred, thereby lowering power consumption of the user equipment.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals assign corresponding parts throughout the several views and may be used to assign like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort.

In the drawings:

FIG. 1 is a flowchart of the message transmitting method of Embodiment 1 of this disclosure;

FIG. 2 is another flowchart of the message transmitting method of Embodiment 1 of this disclosure;

FIG. 3 is a schematic diagram of identity assignment of Embodiment 1 of this disclosure;

FIG. 4 is another schematic diagram of the identity assignment of Embodiment 1 of this disclosure;

FIG. 5 is a schematic diagram of feeding back a reception level of Embodiment 1 of this disclosure;

FIG. 6 is a flowchart of the message transmitting method of Embodiment 2 of this disclosure;

FIG. 7 is another flowchart of the message transmitting method of Embodiment 2 of this disclosure;

FIG. 8 is a schematic diagram of the message transmitting apparatus of Embodiment 3 of this disclosure;

FIG. 9 is another schematic diagram of the message transmitting apparatus of Embodiment 3 of this disclosure;

FIG. 10 is a schematic diagram of the message receiving apparatus of Embodiment 4 of this disclosure;

FIG. 11 is another schematic diagram of the message receiving apparatus of Embodiment 4 of this disclosure;

Figure 12:
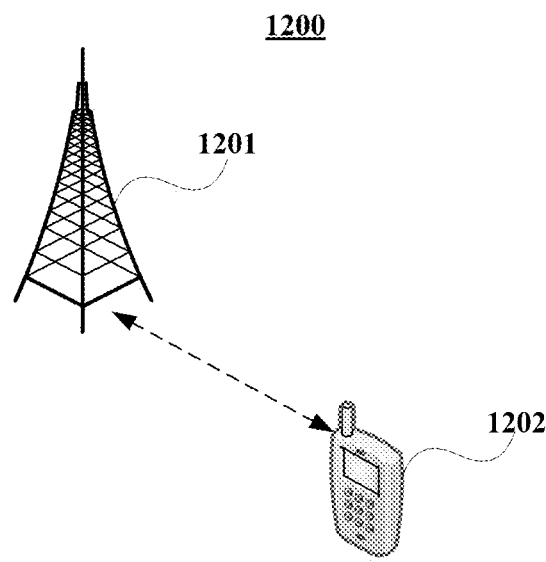
Figure 13:
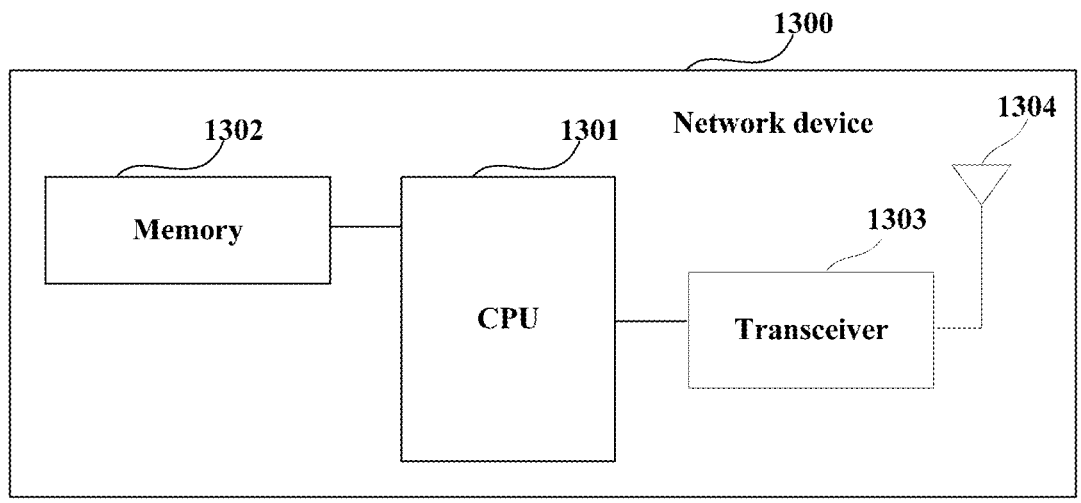
Figure 14:
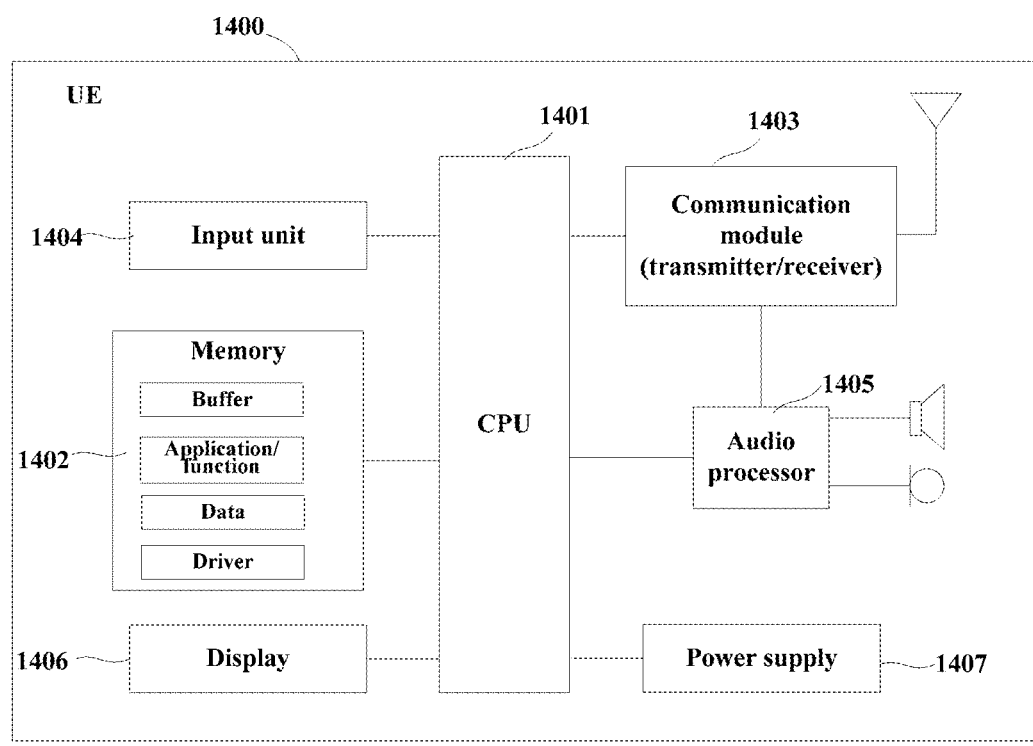

FIG. 12 is a schematic diagram of a structure of the communication system of Embodiment 5 of this disclosure;

FIG. 13 is a schematic diagram of a structure of the network device of Embodiment 5 of this disclosure; and FIG. 14 is a schematic diagram of a structure of the user equipment of Embodiment 5 of this disclosure.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various embodiments of this disclosure shall be described below with reference to the accompanying drawings. Such embodiments are illustrative only, and are intended to limited this disclosure.

In this disclosure, a base station may be referred to as an access point, a broadcast transmitter, a node B, or an evolved node B (eNB), etc., and may include some or all functions of them. A term "base station" shall be used in the text, and each base station provides communication coverage for a specific geographical region.

In this disclosure, a mobile station or equipment may be referred to as a user equipment (UE). The UE may be fixed or mobile, and may also be referred to as a mobile station, a terminal, an access terminal, a user unit, or a station, etc. The UE may be a cellular phone, a personal digital assistant (PDA), a wireless modem, a wireless communication device, a handhold device, a lap-top computer, a cordless telephone, and a vehicle, etc.

The embodiments of this disclosure shall be described below with reference to the accompanying drawings.

Embodiment 1

These embodiments provide a message transmitting method, which shall be described from a network device (such as a base station) side.

Figure 1:
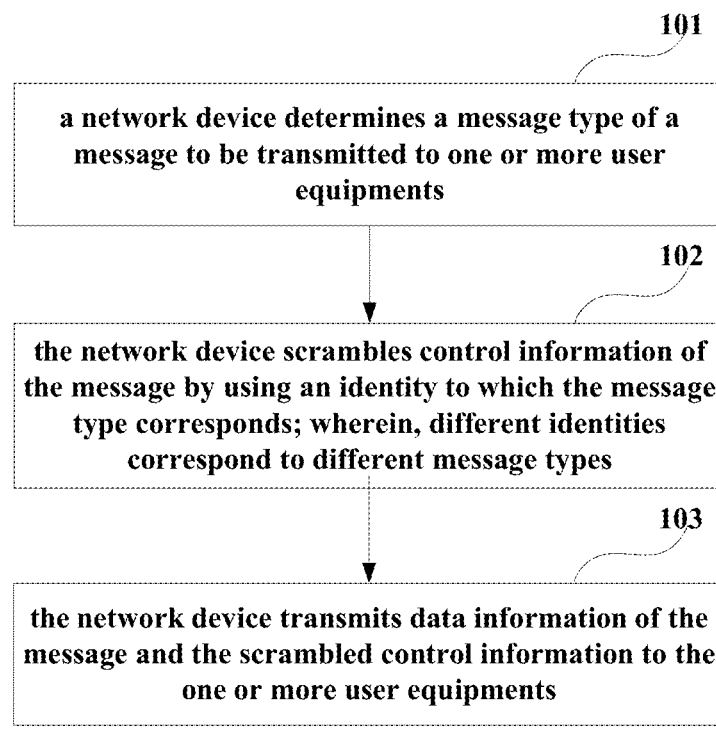

FIG. 1 is a flowchart of the message transmitting method of the embodiment of this disclosure. As shown in FIG. 1, the message transmitting method includes:

Block 101: a network device determines a message type of a message to be transmitted to one or more user equipments.

Block 102: the network device scrambles control information of the message by using an identity to which the message type corresponds; wherein, different identities correspond to different message types; and Block 103: the network device transmits data information of the message and the scrambled control information to the one or more user equipments.

In an embodiment, the user equipment may be, for example, an MTC terminal of an IoT system, or may be a V2P terminal of an Internet of vehicles. However, this disclosure is not limited thereto; for example, the user equipment may also be a terminal of another network system. and this disclosure is applicable to any system performing message transmission/reception.

In an embodiment, the network device may be a base station in a cell to which the user equipment belongs, the base station may be a macro base station (such as an eNB), and the user equipment may be served by a macro cell generated by the macro base station. And the base station in the embodiments of this disclosure may also be a pico base station, and the UE may be served by a pico cell generated by the pico base station. However, the embodiment of this disclosure is not limited thereto, and a particular scenario may be determined according to an actual situation.

And furthermore, the network device may also be a centralized control device or apparatus, such as a road side unit (RSU), or the like, and following description shall be given by taking that the network device is a base station as an example only.

In an embodiment, the message type may include a periodic broadcast message, or an event triggering message, etc., and may also include a message service type, or may be a message transmitted by a type of devices, etc. However, this disclosure is not limited thereto, and a particular message type may be determined according to an actual situation. Furthermore, the identity (which may be, for example, referred to a group-ID in this disclosure) may be an identity obtained according to a generating rule of a radio network temporary identity (RNTI), or may be an identity generated randomly. However, this disclosure is not limited thereto, and any existing identity generation method may be used.

In an embodiment, different identities correspond to different message types. A correspondence between the message type and the identity may be preconfigured, or may be configured according to auxiliary information reported by the user equipment. By scrambling the message by using the identity to which the message type corresponds, the user equipment may be made to process a preferred message only.

Table 1 shows examples in which different identities correspond to different message types.

TABLE 1

| Message type | Identity | Priority |
| --- | --- | --- |
| Type of a periodic broadcast message | ID1 | 1 |
| Type of an event triggering message | ID2 | 2 |
| Type 1 of a message service | ID3 | 3 |
| ... | ... | ... |

It should be appreciated that Table 1 shows several examples only; however, this disclosure is not limited thereto. The priority of the message type may be cell-specific, or may be UE-specific. For example, in a case of being UE-specific, for different UEs, the same message type may have different priorities.

In an embodiment, the message includes data information, and the data information may be associated with, for example, downlink control information (DCI); for example, time-frequency resources occupied by the data information transmitted to the UE are indicated in the DCI, and the UE may only receive the data information according to the information in the DCI, so as to acquire contents of the message. In the embodiment of this disclosure, the DCI of the message may be scrambled by using the identity to which the message type corresponds. Reference may be made to related techniques for how to transmit the message (data information) and the control information and how to scramble or descramble the DCI, which shall not be described herein any further.

Figure 2:
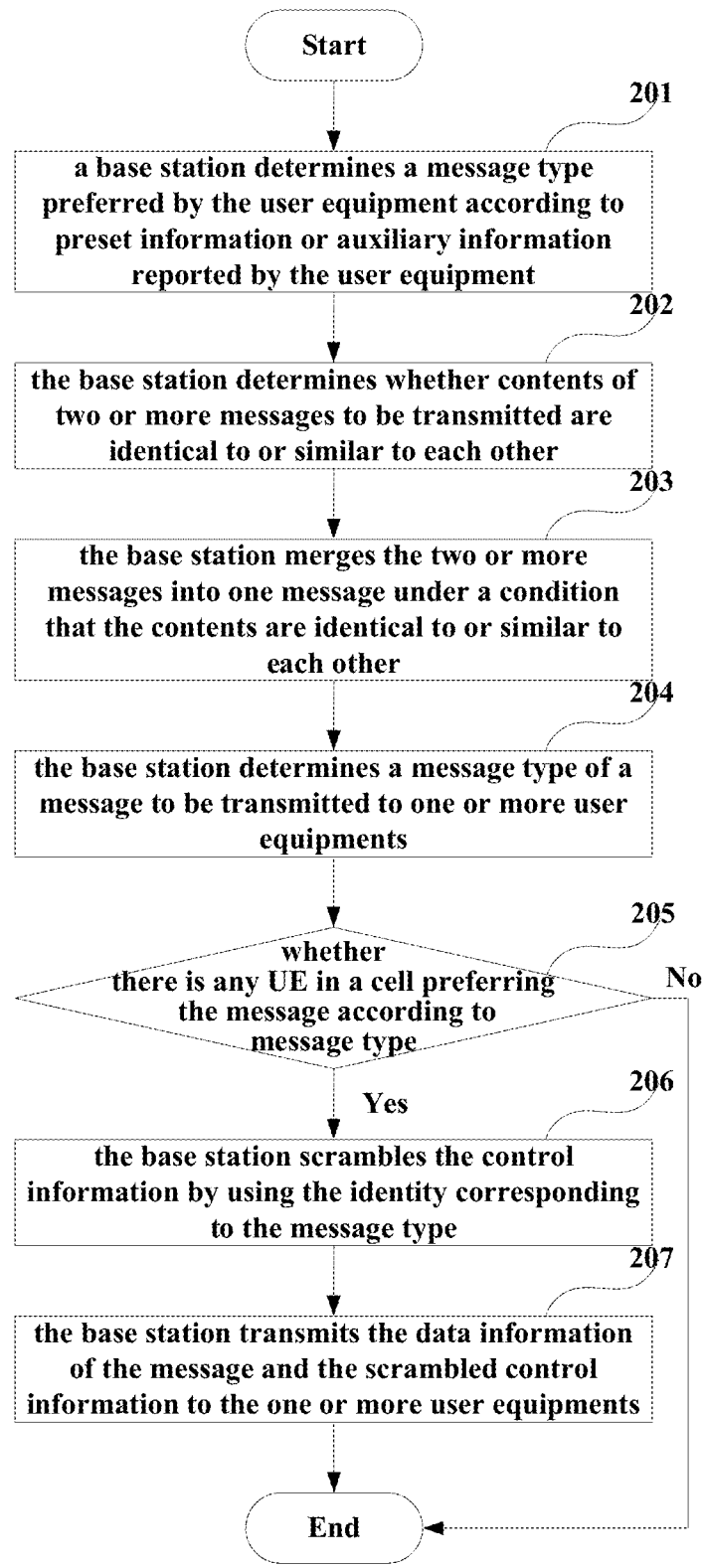

FIG. 2 is another flowchart of the message transmitting method of the embodiment of this disclosure, which shall be described by taking a base station as an example. As shown in FIG. 2, the message transmitting method includes:

Block 201: a base station determines a message type preferred by the user equipment according to preset information or the auxiliary information reported by the user equipment.

In an embodiment, the base station may predetermine message types preferred (or desired) by every user equipment in a cell according to the preset information. For example, UE 1 prefers a periodic broadcast message type, UE 2 prefers an event triggering message type, UE 3 prefers message service type 1, and so on.

In addition, the base station may also determine message types preferred by every user equipment in the cell according to a preferred message type (or may also include a priority) in the auxiliary information reported by the user equipment. For example, if the preferred message types reported by UE 1 are the periodic broadcast message type and the message service type 2, the base station determines that the message types preferred by UE 1 are the periodic broadcast message type and the message service type 2.

Furthermore, the base station may determine a message type that is preferred by every user equipment in the cell according to a user equipment type and/or a user equipment position in the auxiliary information reported by the user equipment. For example, in the V2X communication, if UE 1 reports that a user equipment type is a P-UE (pedestrian UE) type, and the base station may determine that a message type that UE 1 prefers is an event trigger message type; for another example, in the V2X communication, if UE 2 reports position information, the base station may determine that a message preferred by UE 2 is a message transmitted by a V-UE (vehicle UE) within a range of m meters from the UE 2.

It should be appreciated that the foregoing only schematically illustrates how to determine the message type preferred by the user equipment. However, this disclosure is not limited thereto, and a particular implementation may be determined according to an actual situation. How the user equipment reports the auxiliary information shall be described later.

Block 202: the base station determines whether contents of two or more messages to be transmitted are identical to or similar to each other.

Block 203: the base station merges the two or more messages into one message under a condition that the contents of the two or more messages to be transmitted are identical to or similar to each other.

In an embodiment, by merging the identical or similar messages, the base station may reduce an amount of transmission of messages, thereby alleviating a problem of air-interface congestion.

Block 204: the base station determines a message type of a message to be transmitted to one or more user equipments.

Block 205: the base station determines whether there is any user equipment in a cell preferring the message according to the message type of the message, discarding or not transmitting the message if there is no user equipment in the cell preferring the message, and executing block 206 if there is at least a user equipment in the cell preferring the message.

In an embodiment, according to block 201, the base station may learn which message types are preferred by every user equipment in the cell (the user equipment prefers a message of a message type if the user equipment prefers the message type); and then, according to the message type of the message in the block 204, the base station may determine which user equipments prefer the message and which user equipments do not prefer the message.

In an embodiment, if there is no user equipment in the cell preferring the message of the message type, the message is discarded or not transmitted. Hence, the base station may not need to transmit a message that all the user equipment does not prefer, which may reduce an amount of transmission of messages, thereby alleviating the problem of air-interface congestion.

Block 206: the base station scrambles the control information of the message by using the identity corresponding to the message type; wherein, different identities correspond to different message types; and Block 207: the base station transmits the data information of the message and the scrambled control information to the one or more user equipments.

It should be appreciated that FIG. 2 only schematically explains the embodiment of this disclosure; however, this disclosure is not limited thereto. For example, an order of execution of the blocks or steps may be appropriately adjusted; and furthermore, some other blocks or steps may be added, or some of these blocks or steps may be reduced. For example, when there is only one message to be transmitted, blocks 202 and 203 may be omitted. And appropriate modifications may be made by those skilled in the art according to what is described above, without being limited to those contained in FIG. 2.

How to transmit the message by the network device is illustrated above. And how to assign identities and/or feed back reception levels according to the auxiliary information reported by the user equipment or the preset information shall be described below.

Figure 3:
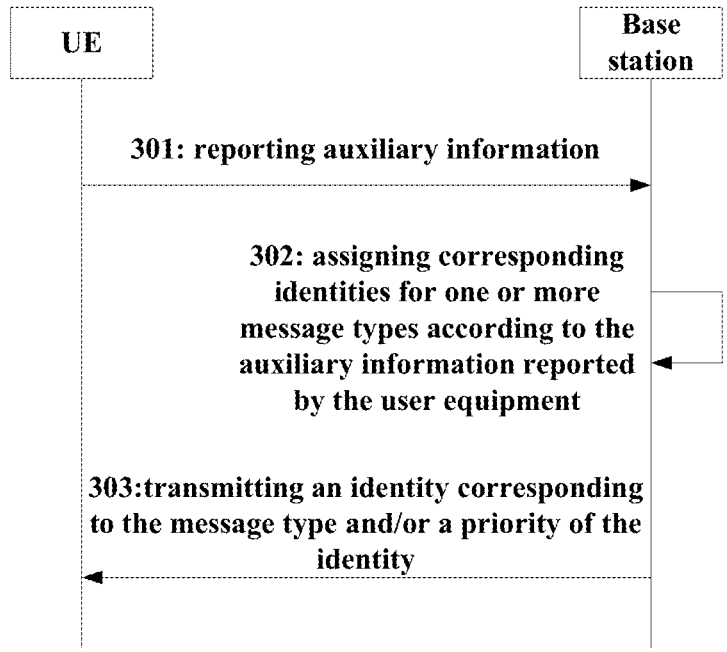

FIG. 3 is a schematic diagram of identity assignment of the embodiment of this disclosure, in which reporting by a user equipment is shown. As shown in FIG. 3, a process of the identity assignment may include:

301: a base station receives auxiliary information reported by a user equipment.

In an embodiment, the auxiliary information may include one or more pieces of the following information: information on a type of the user equipment, information on one or more message types preferred by the user equipment, information on one or more priorities of the one or more message types preferred by the user equipment, information on a position of the user equipment, information on a power state of the user equipment, and information on a power level of the user equipment.

It should be appreciated that the above auxiliary information may be reported for multiple times by the user equipment at an application layer or a physical uplink shared channel (PUSCH).

For example, the information on a message type preferred by the user equipment and/or the information on a priority of the information on the message type may be reported when the user equipment accesses the network, or may be reported in a periodic manner, or may be reported when the information (the information on a message type and/or the information on a priority) is changed;

the information on a type of the user equipment may be reported when the user equipment accesses the network;

the information on a position of the user equipment may be reported periodically, or when the user equipment enters another region from one region in a cell, or when a displacement distance of the user equipment reaches a preset threshold (such as X meters);

and the information on a power state and/or the information on a power level of the user equipment may be reported periodically, or when the information (the information on a power state and/or the information on a power level) is changed.

302: the base station assigns corresponding identities for one or more message types according to the auxiliary information reported by the user equipment.

303: the base station transmits an identity corresponding to the message type and/or a priority of the identity to the user equipment.

In an embodiment, after receiving the auxiliary information reported by the user equipment, the base station may assign a corresponding identity (group-ID) according to the preferred message type and its priority. If the reported message types are all assigned with group-IDs, the base station may directly feed back corresponding group-IDs and priorities of the group-IDs to the user equipment; and if all or a part of the reported message types have not been assigned with group-IDs, the base station may assign a group-ID for each message type having not been assigned with a group-ID, and feed back a group-ID corresponding to the message type preferred by the user equipment and a priority of group-ID to the user equipment.

Figure 4:
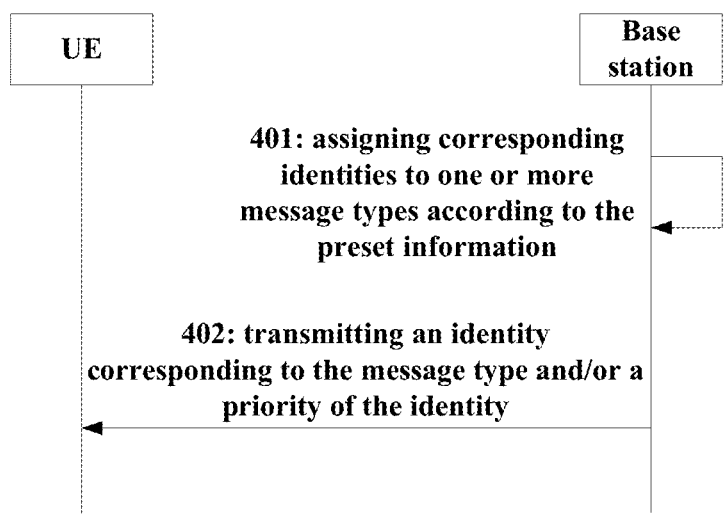

FIG. 4 is another schematic diagram of the identity assignment of the embodiment of this disclosure. As shown in FIG. 4, a process of the identity assignment may include:

401: the base station assigns corresponding identities to one or more message types according to the preset information; and

402: the base station transmits an identity corresponding to the message type and/or a priority of the identity to the user equipment.

In an embodiment, the base station may preconfigure the message type and its priority, and correspondingly, assign a corresponding group-ID, and then may inform the user equipment in the cell via broadcast.

The identity to which the assigned message type corresponds is illustrated in FIGS. 3 and 4. It should be appreciated that an order of the above priorities of Group-ID may be indicated explicitly, or may be implied in a feeding back order of the group-ID. And furthermore, the base station may configure a universal group-ID, which is used to scramble DCI of messages needing to be received by all user equipments.

In an embodiment, the base station may further determine a reception level of the user equipment when the auxiliary information reported by the user equipment contains the information on a power state and/or the information on a power level.

Figure 5:
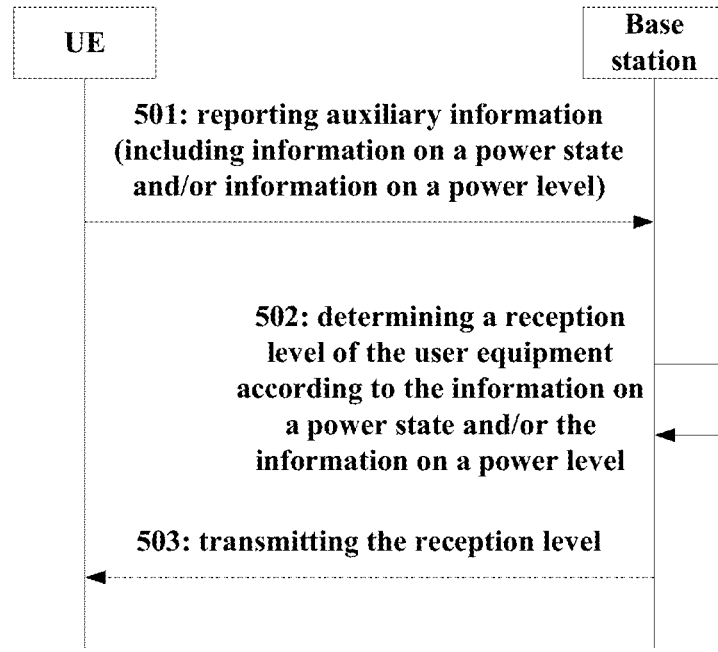

FIG. 5 is a schematic diagram of feeding back the reception level of the embodiment of this disclosure. As shown in FIG. 5, a process of feeding back the reception level may include:

501: the base station receives the auxiliary information reported by the user equipment, the auxiliary information including the information on a power state and/or the information on a power level; and

502: the base station determines a reception level of the user equipment according to the information on a power state and/or the information on a power level in the auxiliary information.

As shown in FIG. 3, the method may further include:

503: the base station transmits the reception level to the user equipment.

It should be appreciated that FIGS. 3-5 only schematically explains the embodiment of this disclosure; however, this disclosure is not limited thereto. For example, an order of execution of the blocks or steps may be appropriately adjusted; and furthermore, some other blocks or steps may be added, or some of these blocks or steps may be reduced. Furthermore, the contents in FIGS. 3-5 may be implemented in a combined manner, or may be combined with FIG. 2. And appropriate modifications may be made by those skilled in the art according to what is described above, without being limited to those contained in FIGS. 2-5.

It can be seen from the above embodiment that the network device scrambles the control information of the message by using the identity to which the message type corresponds, and the user equipment descrambles the control information of the message by using the identity to which the message type corresponds, and continues to receive the data information only when the control information is successfully descrambled. Hence, the user equipment may not proceed with processing a message that is not preferred, thereby lowering power consumption of the user equipment.

And furthermore, the network device may filter out those messages that are not preferred by the user equipment, or may merge identical or similar messages. Hence, the base station may reduce an amount of transmission of messages, thereby alleviating a problem of air-interface congestion.

Embodiment 2

These embodiments provide a message receiving method, which shall be described from a user equipment side, with contents identical to those in Embodiment 1 being not going to be described herein any further.

Figure 6:
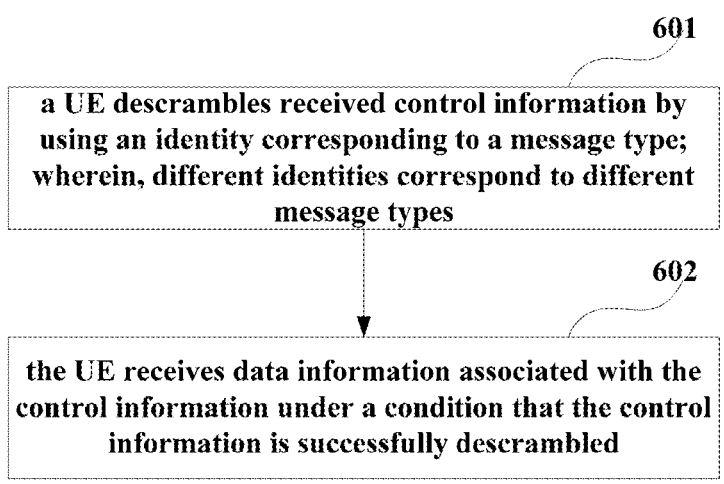

FIG. 6 is a flowchart of the message receiving method of the embodiment of this disclosure. As shown in FIG. 6, the message receiving method includes:

Block 601: a user equipment descrambles received control information by using an identity corresponding to a message type; wherein, different identities correspond to different message types; and Block 602: the user equipment receives data information associated with the control information under a condition that the control information is successfully descrambled.

In an embodiment, a correspondence between the message type and the identity may be preconfigured, or may be configured by the base station according to the auxiliary information reported by the user equipment. If there are multiple identities, the received control information may be descrambled according to priorities of the identities.

For example, the DCI is descrambled by using different identities in an order of the priorities. The DCI may be descrambled by using an identity of a highest priority first, if the descrambling is successful, the data information associated with the DCI is continued to be received, and if the descrambling is unsuccessful, the DCI is descrambled by using an identity of a secondarily highest priority, and so on. If all the identities of the user equipment cannot be used to successfully descramble the DCI, it shows that the message associated with the DCI does not belong to the message type preferred by the user equipment, and the message is not processed any longer. Hence, the user equipment may sequentially receive messages according to priorities of the preferred message types, thereby reducing power consumption of the user equipment.

Figure 7:
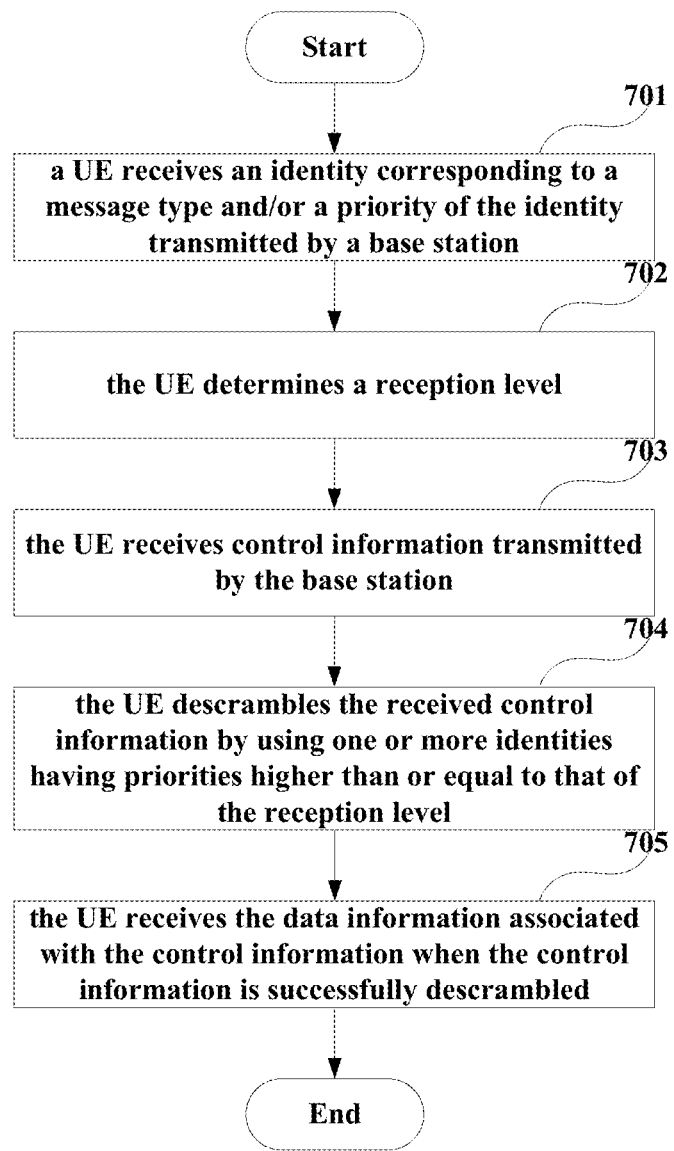

FIG. 7 is another schematic diagram of the message receiving method of the embodiment of this disclosure, which shall be described still by taking a user equipment as an example. As shown in FIG. 7, the message receiving method includes:

Block 701: the user equipment receives an identity corresponding to the message type and/or a priority of the identity transmitted by the base station.

In an embodiment, the identity corresponding to the message type may be one or more. And a correspondence between the message type and the identity may be preconfigured by the base station, or may be configured by the base station according to the auxiliary information reported by the user equipment.

For example, the identities received by the user equipment are: ID 1 (corresponding to priority 1), ID 2 (corresponding to priority 2), and ID 3 (corresponding to priority 3).

Block 702: the user equipment determines a reception level.

In an embodiment, the user equipment may determine the reception level of the user equipment according to a current power state and/or a current power level, or may determine the reception level of the user equipment according to the information on a reception level received from the base station.

For example, if the power state is 60%, it is determined that a current reception level of the user equipment is 2.

Block 703: the user equipment receives control information transmitted by the base station.

Block 704: the user equipment descrambles the received control information by using one or more identities having priorities higher than or equal to that of the reception level.

For example, the DCI may be descrambled by using ID 2 and ID 3 (priorities of which are both higher than or equal to 2).

Block 705: the user equipment receives the data information associated with the control information when the control information is successfully descrambled.

Hence, the user equipment may select and receive a part of messages of higher priorities according to the current power state/level, that is, only group-IDs corresponding to the messages of higher priorities are used in attempts to descramble the downlink control information, which may further lower the power consumption of the user equipment.

In an embodiment, as shown in FIG. 3, the user equipment may report the auxiliary information to the network device, and receive the identity corresponding to the message type and/or the priority of the identifier that is assigned by the network device according to the auxiliary information.

The auxiliary information may include one or more pieces of the following information: information on a type of the user equipment, information on one or more message types preferred by the user equipment, information on one or more priorities of the one or more message types preferred by the user equipment, information on a position of the user equipment, information on a power state of the user equipment, and information on a power level of the user equipment.

In an embodiment, the information on message type preferred by the user equipment and/or the information on a priority may be reported when the user equipment accesses a network, or reported periodically, or reported when the information is changed;

the information on a type of the user equipment may be reported when the user equipment accesses a network;

the information on a position of the user equipment may be reported periodically, or when the user equipment enters another region from one region in a cell, or when a displacement distance of the user equipment reaches a preset threshold;

the information on a power state and/or the information on a power level of the user equipment may be reported periodically, or when the information is changed.

It should be appreciated that a manner for reporting the auxiliary information is only illustrated above; however, this disclosure is not limited thereto.

In an embodiment, as shown in FIG. 4, the user equipment may further receive an identity corresponding to a message type and/or a priority of the identity assigned by the network device according to the preset information.

In an embodiment, as shown in FIG. 5, the user equipment may further report the auxiliary information to the network device, and receive the reception level fed back by the network device according to the auxiliary information.

It should be appreciated that FIG. 7 only schematically explains the embodiment of this disclosure; however, this disclosure is not limited thereto. For example, an order of execution of the blocks or steps may be appropriately adjusted; and furthermore, some other blocks or steps may be added, or some of these blocks or steps may be reduced. Furthermore, the contents of FIG. 7 and FIGS. 3-5 may be combined. And appropriate modifications may be made by those skilled in the art according to what is described above, without being limited to those contained in FIG. 7.

It can be seen from the above embodiment that the network device scrambles the control information of the message by using the identity to which the message type corresponds, and the user equipment descrambles the control information by using the identity to which the message type corresponds, and continues to receive the data information only when the control information is successfully descrambled. Hence, the user equipment may not proceed with processing a message that is not preferred, thereby lowering power consumption of the user equipment.

And furthermore, the user equipment may selectively receive a part of the messages according to the reception level, such as descrambling the control information by only using the identities to which the message types of higher priorities correspond, thereby further lowering power consumption of the user equipment.

Embodiment 3

These embodiments provide a message transmitting apparatus, which may be configured in a network device. These embodiments correspond to the message transmitting method in Embodiment 1, with contents identical to those in Embodiment 1 being not going to be described herein any further.

Figure 8:
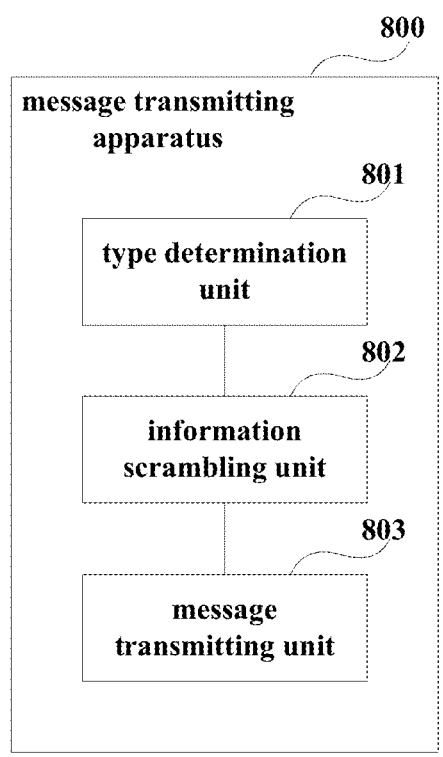

FIG. 8 is a schematic diagram of the message transmitting apparatus of the embodiment of this disclosure. As shown in FIG. 8, the message transmitting apparatus 800 includes:

a type determination unit 801 configured to determine a message type of a message to be transmitted to one or more user equipments;

an information scrambling unit 802 configured to scramble control information of the message by using an identity to which the message type corresponds; wherein, different identities correspond to different message types; and a message transmitting unit 803 configured to transmit data information of the message and the scrambled control information to the one or more user equipments.

In an embodiment, a correspondence between the message type and the identity may be preconfigured, or configured according to auxiliary information reported by the user equipment.

Figure 9:
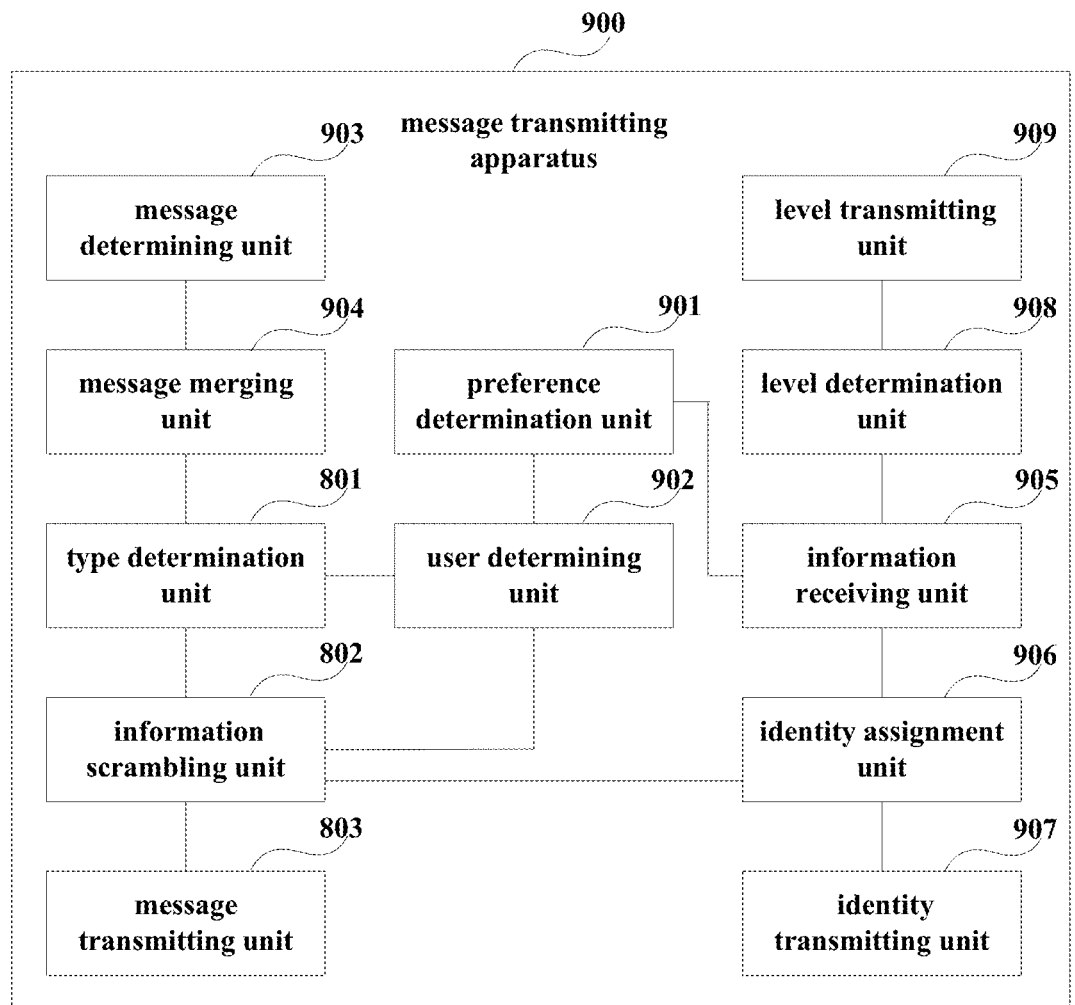

FIG. 9 is another schematic diagram of the message transmitting apparatus of the embodiment of this disclosure. As shown in FIG. 9, the message transmitting apparatus 900 includes a type determination unit 801, an information scrambling unit 802 and a message transmitting unit 803, as described above.

As shown in FIG. 9, the message transmitting apparatus 900 may further include:

a preference determination unit 901 configured to determine one or more message types preferred by the user equipment according to preset information or the auxiliary information reported by the user equipment.

As shown in FIG. 9, the message transmitting apparatus 900 may further include:

a user determining unit 902 configured to determine whether there is any user equipment in a cell preferring the message according to the message type of the message;

and the information scrambling unit 802 and the message transmitting unit 803 are configured to scramble the control information by using the identity corresponding to the message type, and transmit the data information of the message and the scrambled control information, under a condition that there is any user equipment in the cell preferring the message.

As shown in FIG. 9, the message transmitting apparatus 900 may further include:

a message determining unit 903 configured to determine whether contents of two or more messages to be transmitted are identical to or similar to each other; and a message merging unit 904 configured to merge the two or more messages into one message under a condition that the contents of the two or more messages to be transmitted are identical to or similar to each other.

As shown in FIG. 9, the message transmitting apparatus 900 may further include:

an information receiving unit 905 configured to receive the auxiliary information reported by the one or more user equipment.

The auxiliary information includes one or more pieces of the following information: information on a type of the user equipment, information on one or more message types preferred by the user equipment, information on one or more priorities of the one or more message types preferred by the user equipment, information on a position of the user equipment, information on a power state of the user equipment, and information on a power level of the user equipment.

As shown in FIG. 9, the message transmitting apparatus 900 may further include:

an identity assignment unit 906 configured to assign corresponding identities to one or more message types according to the preset information or the auxiliary information reported by the user equipment.

As shown in FIG. 9, the message transmitting apparatus 900 may further include:

an identity transmitting unit 907 configured to transmit one or more identities corresponding to the one or more message types and/or one or more priorities of the one or more identities to the user equipment.

As shown in FIG. 9, the message transmitting apparatus 900 may further include:

a level determination unit 908 configured to determine a reception level of the user equipment according to the information on a power state and/or the information on a power level in the auxiliary information.

As shown in FIG. 9, the message transmitting apparatus 900 may further include:

a level transmitting unit 909 configured to transmit the reception level to the one or more user equipment.

It can be seen from the above embodiment that the network device scrambles the control information of the message by using the identity to which the message type corresponds, and the user equipment descrambles the control information by using the identity to which the message type corresponds, and continues to receive the data information only when the control information is successfully descrambled. Hence, the user equipment may not proceed with processing a message that is not preferred, thereby lowering power consumption of the user equipment.

Embodiment 4

These embodiments provide a message receiving apparatus, which may be configured in a user equipment. These embodiments correspond to the message receiving method in Embodiment 2, with contents identical to those in Embodiment 1 or 2 being not going to be described herein any further.

Figure 10:
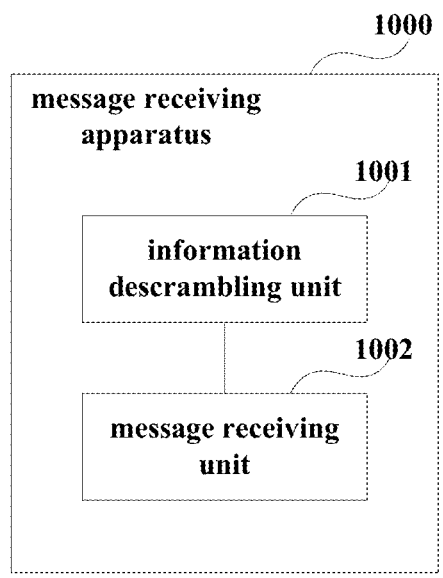

FIG. 10 is a schematic diagram of the message receiving apparatus of the embodiment of this disclosure. As shown in FIG. 10, the message receiving apparatus 1000 includes:

an information descrambling unit 1001 configured to descramble received control information by using an identity corresponding to a message type; wherein, different identities correspond to different message types; and a message receiving unit 1002 configured to receive data information associated with the control information under a condition that the control information is successfully descrambled.

In an embodiment, when there are a plurality of identities, the information descrambling unit 1001 is configured to descramble the received control information according to priorities of the identities.

Figure 11:
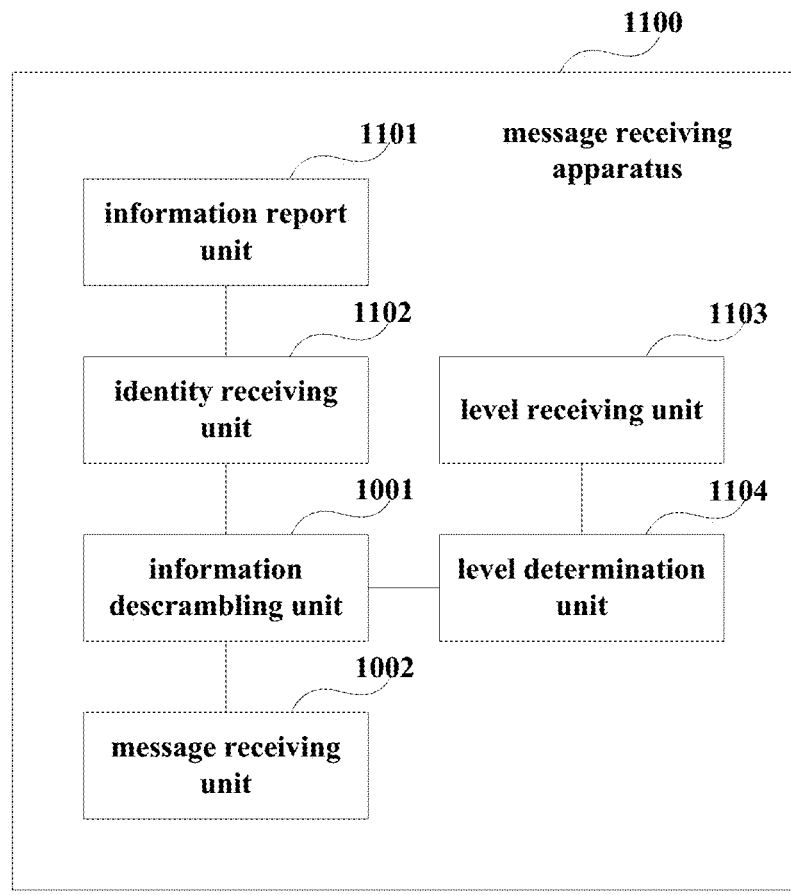

FIG. 11 is another schematic diagram of the message receiving apparatus of the embodiment of this disclosure. As shown in FIG. 11, the message receiving apparatus 1100 includes an information descrambling unit 1001 and a message receiving unit 1002, as described above.

As shown in FIG. 11, the message receiving apparatus 1100 may further include:

an information report unit 1101 configured to report auxiliary information to a network device.

The auxiliary information includes one or more pieces of the following information: information on a type of the user equipment, information on one or more message types preferred by the user equipment, information on one or more priorities of the one or more message types preferred by the user equipment, information on a position of the user equipment, information on a power state of the user equipment, and information on a power level of the user equipment.

For example, the message type information preferred by the user equipment and/or the priority information are/is reported when the user equipment accesses a network, or reported periodically, or reported when the information is changed;

the information on a type of the user equipment is reported when the user equipment accesses a network;

the information on a position of the user equipment is reported periodically, or when the user equipment enters another region from one region in a cell, or when a displacement distance of the user equipment reaches a preset threshold;

the information on a power state and/or the information on a power level of the user equipment are/is reported periodically, or when the information is changed.

As shown in FIG. 11, the message receiving apparatus 1100 may further include:

an identity receiving unit 1102 configured to receive one or more identities corresponding to one or more message types and/or one or more priorities of the one or more identities transmitted by a network device.

As shown in FIG. 11, the message receiving apparatus 1100 may further include:

a level receiving unit 1103 configured to receive information on a reception level transmitted by the network device; wherein, the information on a reception level is determined by the network device according to the information on a power state and/or the information on a power level in the auxiliary information.

As shown in FIG. 11, the message receiving apparatus 1100 may further include:

a level determination unit 1104 configured to determine a reception level of the user equipment according to a current power state and/or a current power level of the user equipment, or according to the information on a reception level received from the network device;

and the information descrambling unit 1001 may further be configured to descramble the received control information by using one or more identities having priorities higher than or equal to that of the reception level.

It can be seen from the above embodiment that the network device scrambles the control information of the message by using the identity to which the message type corresponds, and the user equipment descrambles the control information by using the identity to which the message type corresponds, and continues to receive the data information only when the control information is successfully descrambled. Hence, the user equipment may not proceed with processing a message that is not preferred, thereby lowering power consumption of the user equipment.

Embodiment 5

These embodiments of this disclosure provide a communication system, with contents identical to those in embodiments 1-4 being not going to be described herein any further.

FIG. 12 is a schematic diagram of a structure of the communication system of the embodiment of this disclosure. As shown in FIG. 12, the communication system 1200 includes a network device (such as a base station) 1201 and a user equipment 1202. The network device 1201 may be configured with the message transmitting apparatus 800 or 900 described in Embodiment 3, and the user equipment 1202 may be configured with the message receiving apparatus 1000 or 1100 described in Embodiment 4.

The embodiment of this disclosure further provides a network device.

FIG. 13 is a schematic diagram of a structure of the network device of the embodiment of this disclosure. As shown in FIG. 13, the network device 1300 may include a central processing unit (CPU) 1301 and a memory 1302, the memory 1302 being coupled to the central processing unit 1301. The memory 1302 may store various data, and furthermore, it may store a program for data processing, and execute the program under control of the central processing unit 1301, so as to receive various information transmitted by user equipment, and transmit request information to the user equipment.

In an embodiment, the functions of the message transmitting apparatus 800 or 900 may be integrated into the central processing unit 1301. The central processing unit 1301 may be configured to carry out the message transmitting method described in Embodiment 1.

For example, the central processing unit 1301 may be configured to perform the following control: determining a message type of a message to be transmitted to one or more user equipments; scrambling control information of the message by using an identity to which the message type corresponds; wherein, different identities correspond to different message types; and transmitting data information of the message and the scrambled control information to the one or more user equipments.

In another embodiment, the message transmitting apparatus 800 or 900 and the central processing unit 1301 may be configured separately. For example, the message transmitting apparatus 800 or 900 may be configured as a chip connected to the central processing unit 1301, with its functions being realized under control of the central processing unit 1301.

Furthermore, as shown in FIG. 13, the network device 1300 may include a transceiver 1303, and an antenna 1304, etc. Functions of the above components are similar to those in the relevant art, and shall not be described herein any further. It should be noted that the network device 1300 does not necessarily include all the parts shown in FIG. 13, and furthermore, the network device 1300 may include parts not shown in FIG. 13, and the relevant art may be referred to.

This embodiment further provides a user equipment.

FIG. 14 is a schematic diagram of a structure of the user equipment of the embodiment of this disclosure. As shown in FIG. 14, the user equipment 1400 may include a central processing unit 1401 and a memory 1402, the memory 1402 being coupled to the central processing unit 1401. It should be noted that this figure is illustrative only, and other types of structures may also be used, so as to supplement or replace this structure and achieve a telecommunications function or other functions.

As shown in FIG. 14, the central processing unit 1401 is sometimes referred to as a controller or control, which may include a microprocessor or other processor devices and/or logic devices, and the central processing unit 1401 receives input and controls operations of every component of the user equipment 1400.

The central processing unit 1401 may be configured to carry out the message receiving method described in Embodiment 2. For example, the central processing unit 1401 may be configured to perform the following control: descrambling received control information by using an identity corresponding to a message type; wherein, different identities correspond to different message types; and receiving data information associated with the control information under a condition that the control information is successfully descrambled.

As shown in FIG. 14, the user equipment 1400 may further include a communication module 1403, an input unit 1404, an audio processor 1405, a display 1406, and a power supply 1407. It should be noted that the user equipment 1400 does not necessarily include all the parts shown in FIG. 14, and furthermore, the user equipment 1400 may include parts not shown in FIG. 14, and the relevant art may be referred to.

An embodiment of the present disclosure provides a computer readable program code, which, when executed in a network device, will cause the network device to carry out the message transmitting method as described in Embodiment 1.

An embodiment of the present disclosure provides a storage medium, storing a computer readable program code which will cause a network device to carry out the message transmitting method as described in Embodiment 1.

An embodiment of the present disclosure provides a computer readable program code, which, when executed in a user equipment, will cause the user equipment to carry out the message receiving method as described in Embodiment 2.

An embodiment of the present disclosure provides a storage medium, storing a computer readable program code which will cause a user equipment to carry out the message receiving method as described in Embodiment 2.

The above apparatuses of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The method/apparatus described with reference to the embodiments of this disclosure may be directly embodied as hardware, software modules executed by a processor, or a combination thereof. For example, one or more functional block diagrams and/or one or more combinations of the functional block diagrams shown in FIG. 8 may either correspond to software modules of procedures of a computer program, or correspond to hardware modules. Such software modules may respectively correspond to the steps shown in FIG. 1. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A message transmitting apparatus, comprising:
a receiver configured to receive auxiliary information reported by a user equipment, the auxiliary information comprising information on one or more message types preferred by the user equipment;
processor circuitry configured to:
determine a message type of a message to be transmitted to the user equipment, and
scramble control information of the message by using an identity to which the message type corresponding to a service type corresponds; wherein a correspondence between the message type and the identity is preconfigured and different identities correspond to different message types; and
a transmitter configured to transmit data information of the message and the scrambled control information to the user equipment.

2. The message transmitting apparatus according to claim 1, wherein
the processor circuitry is further configured to determine one or more message types preferred by the user equipment according to preset information or auxiliary information reported by the user equipment.

3. The message transmitting apparatus according to claim 2, wherein
the processor circuitry is further configured to determine whether there is any user equipment in a cell preferring the message according to the message type of the message;
and wherein the processor circuitry is further configured to scramble the control information by using the identity corresponding to the message type, and the transmitter is further configured to transmit the data information and the scrambled control information, under a condition that there is any user equipment in the cell preferring the message.

4. The message transmitting apparatus according to claim 1, wherein
the processor circuitry is further configured to:
determine whether contents of two or more messages to be transmitted are identical to or similar to each other, and
merge the two or more messages into one message under a condition that the contents of the two or more messages to be transmitted are identical to or similar to each other.

5. The message transmitting apparatus according to claim 1, wherein the auxiliary information further comprises one or more pieces of the following information: information on a type of the user equipment, information on one or more priorities of the one or more message types preferred by the user equipment, information on a position of the user equipment, information on a power state of the user equipment, and information on a power level of the user equipment.

6. The message transmitting apparatus according to claim 5, wherein
the processor circuitry is further configured to determine a reception level of the user equipment according to information on a power state and/or information on a power level in the auxiliary information.

7. The message transmitting apparatus according to claim 6, wherein
the processor circuitry is further configured to transmit the reception level to the user equipment.

8. The message transmitting apparatus according to claim 1, wherein
the processor circuitry is further configured to assign corresponding identities to one or more message types according to preset information or auxiliary information reported by the user equipment.

9. The message transmitting apparatus according to claim 8, wherein
the processor circuitry is further configured to transmit one or more identities corresponding to the one or more message types and/or one or more priorities of the one or more identities to the user equipment.

10. A message receiving apparatus, comprising:
a transmitter configured to report auxiliary information comprising information on one or more message types preferred by a user equipment to a network device;
processor circuitry configured to descramble received control information by using an identity to which the message type corresponding to a service type corresponds; wherein a correspondence between the message type and the identity is preconfigured and different identities correspond to different message types; and
a receiver configured to receive data information corresponding to the control information under a condition that the control information is successfully descrambled.

11. The message receiving apparatus according to claim 10, wherein when there are a plurality of identities, the processor circuitry descrambles the received control information according to priorities of the identities.

12. The message receiving apparatus according to claim 10, wherein the auxiliary information further comprises one or more pieces of the following information: information on a type of the user equipment, information on one or more priorities of the one or more message types preferred by the user equipment, information on a position of the user equipment, information on a power state of the user equipment, and information on a power level of the user equipment.

13. The message receiving apparatus according to claim 12, wherein the information on one or more message types preferred by the user equipment and/or the information on one or more priorities are/is reported when the user equipment accesses a network, or reported periodically, or reported when the information is changed;
the information on a type of the user equipment is reported when the user equipment accesses a network;
the information on a position of the user equipment is reported periodically, or when the user equipment enters another region from one region in a cell, or when a displacement distance of the user equipment reaches a preset threshold; and
the information on a power state and/or the information on a power level of the user equipment are/is reported periodically, or when the information is changed.

14. The message receiving apparatus according to claim 10, wherein the receiver is further configured to receive one or more identities corresponding to one or more message types and/or one or more priorities of the one or more identities transmitted by the network device.

15. The message receiving apparatus according to claim 10, wherein the processor circuitry is further configured to receive information on a reception level transmitted by the network device; and the information on a reception level is determined by the network device according to information on a power state and/or information on a power level in the auxiliary information.

16. The message receiving apparatus according to claim 10, wherein the processor circuitry is further configured to determine a reception level of the user equipment according to a current power state and/or a current power level of the user equipment, or according to information on a reception level received from the network device;

and the processor circuitry is further configured to descramble the received control information by using one or more identities having priorities higher than or equal to that of the reception level.

17. A communication system, comprising:
a network device comprising
a receiver configured to receive auxiliary information reported by user equipment, the auxiliary information comprising information on one or more message types preferred by the user equipment;
processor circuitry configured to:
determine a message type of a message to be transmitted to the user equipment, and
scramble control information of the message by using an identity to which the message type corresponding to a service type corresponds, a correspondence between the message type and the identity is preconfigured and different identities correspond to different message types; and
a transmitter configured to transmit data information of the message and the scrambled control information to the user equipment; and
a user equipment comprising
processor circuitry configured to
report auxiliary information comprising information on one or more message types preferred by a user equipment to a network device, and
descramble received control information by using an identity to which the message type corresponding to a service type corresponds; wherein a correspondence between the message type and the identity is preconfigured and different identities correspond to different message types; and
a receiver configured to receive data information corresponding to the control information under a condition that the control information is successfully descrambled.

* * * * *